(12) United States Patent
Yoshihara et al.

(10) Patent No.: US 7,016,180 B2
(45) Date of Patent: Mar. 21, 2006

(54) CAPACITOR

(75) Inventors: Yumiko Yoshihara, Tokyo (JP); Masaaki Kobayashi, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 11/012,832

(22) Filed: Dec. 16, 2004

(65) Prior Publication Data

US 2005/0180090 A1    Aug. 18, 2005

(30) Foreign Application Priority Data

Dec. 26, 2003  (JP)  ........................... P2003-433531
Dec. 26, 2003  (JP)  ........................... P2003-435144

(51) Int. Cl.
  H01G 4/228  (2006.01)
  H01G 9/00   (2006.01)
  H01G 9/10   (2006.01)
(52) U.S. Cl. ....................... 361/540; 361/538; 361/528
(58) Field of Classification Search ........ 361/523–524, 361/528, 531, 537–538, 540, 529
  See application file for complete search history.

(56) References Cited

U.S. PATENT DOCUMENTS 3,579,813 A * 5/1971 Tomiwa .................... 29/25.03
6,813,140 B1 * 11/2004 Huntington ................ 361/528
2003/0169561 A1 * 9/2003 Ohya et al. ................ 361/529
2003/0182781 A1 * 10/2003 Miki et al. ................. 29/25.03

FOREIGN PATENT DOCUMENTS

JP          8-148386   * 6/1996
JP     A-2001-102252      4/2001
JP       2001-257130  * 9/2005

* cited by examiner

Primary Examiner—Eric W. Thomas
(74) Attorney, Agent, or Firm—Oliff & Berridge PLC

(57) ABSTRACT

A capacitor is constituted by a capacitor device including an anode part and a cathode part; and a substrate for mounting the capacitor device. The front face of a main part of the substrate is formed with first and second electrodes connected to the cathode and anode parts, respectively. The rear face of main part is provided with first and second outer electrodes electrically connected to the first and second electrodes by way of first and second conduction paths penetrating through the main part, respectively. The first and second electrodes are arranged in a row in a longitudinal direction of the substrate. The first and second outer electrodes include first and second connection areas for connecting with external wiring. The first and second connection areas extend in the longitudinal direction of the substrate, and are arranged in a row in a direction intersecting the longitudinal direction.

11 Claims, 12 Drawing Sheets

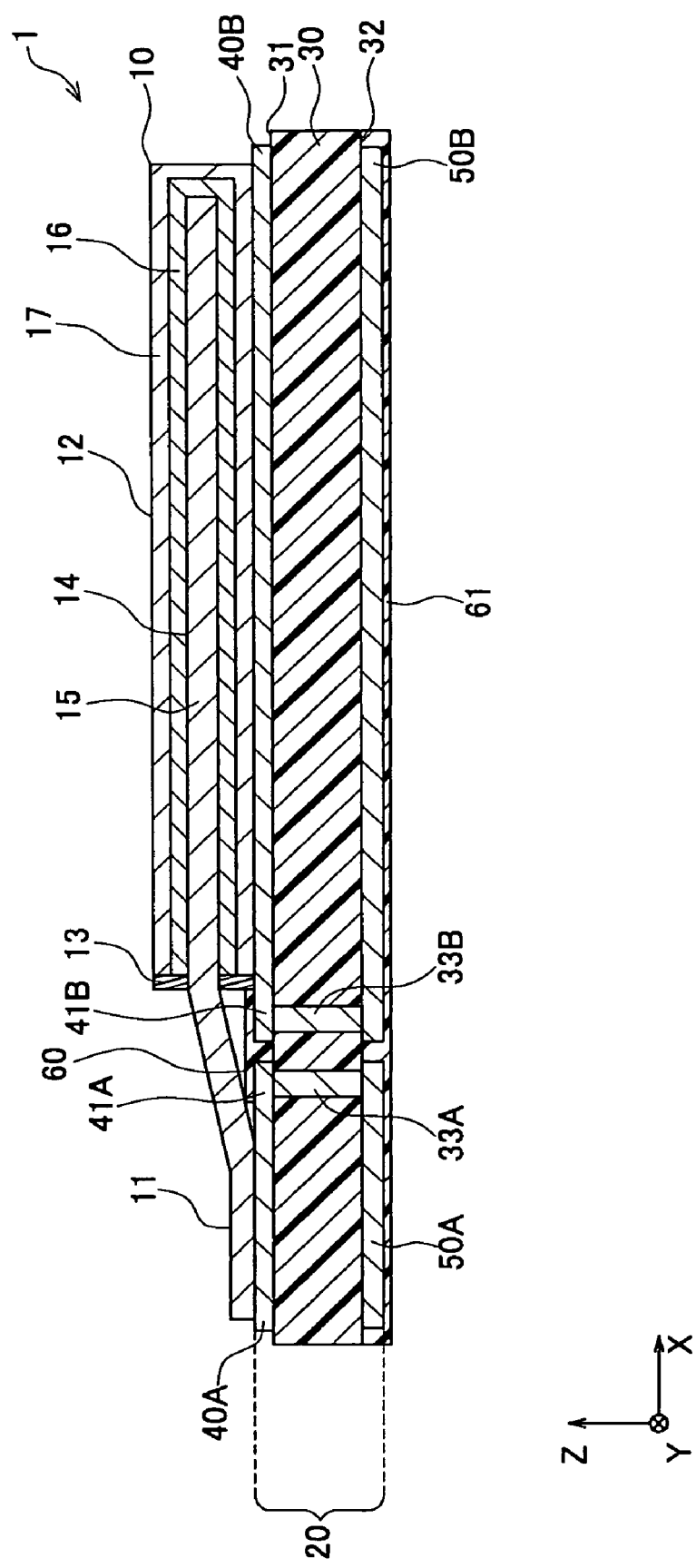

Fig.5A
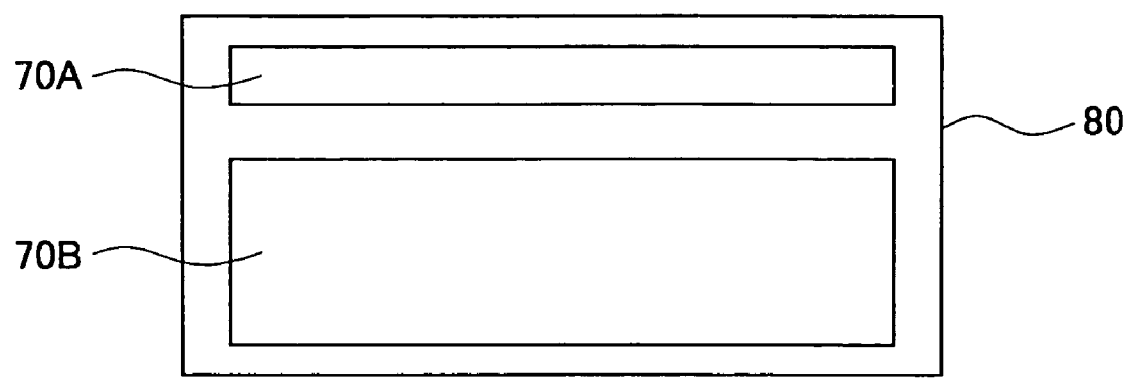
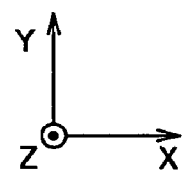

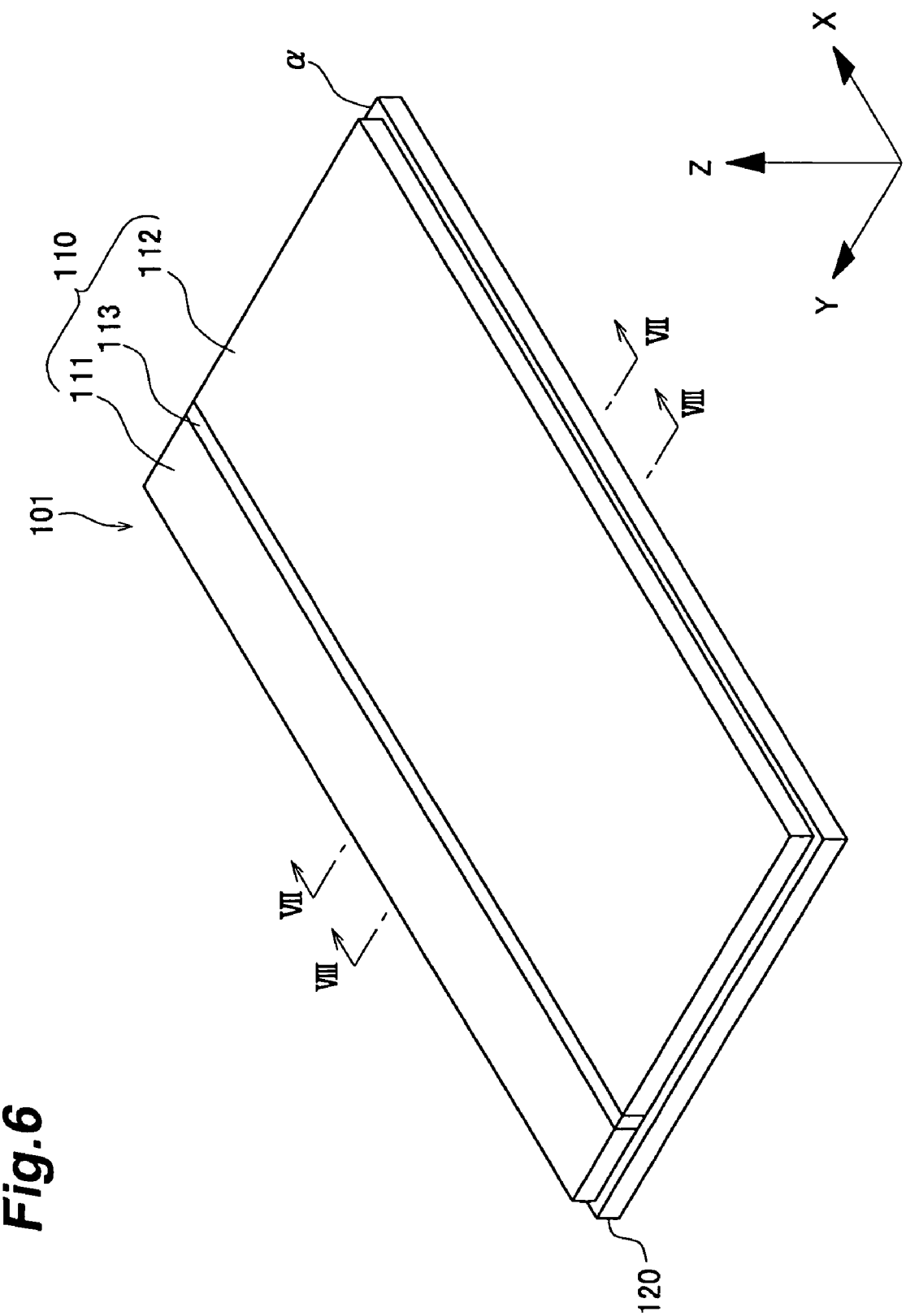

CAPACITOR

BACKGROUND OF THE INVENTION

1. Field of the Invention

The present invention relates to a capacitor.

2. Related Background Art

Known as an example of capacitor constructed by mounting a capacitor device on a substrate is one disclosed in Japanese Patent Application Laid-Open No. 2001-102252.

In the electrolytic capacitor of the above-mentioned publication, through holes are formed in the substrate mounting the capacitor device. The front face of the substrate is provided with first and second electrodes connected to anode and cathode parts of the capacitor device, respectively. The rear face of the substrate is formed with first and second outer electrodes which are paired with the first and second electrodes, respectively.

The first and second electrodes are connected to their corresponding first and second outer electrodes via the through holes formed in the substrate. Therefore, by way of the through holes, the anode and cathode parts of the capacitor device are electrically connected to the first and second outer electrodes provided on the rear face of the substrate. Providing the through holes as such shortens current paths and lowers equivalent series resistance (ESR).

SUMMARY OF THE INVENTION

For further lowering the impedance of capacitors, such as electrolytic capacitors in particular, demands for lowering equivalent series inductance (ESL) have recently been increasing. Also, there have still been needs for enhancing the capacitance of electrolytic capacitors.

It is a first object of the present invention to provide a capacitor which can attain a low ESL while having a large capacitance.

Recently, on the other hand, demands for lowering the ESR have been increasing in order for electrolytic capacitors to attain a lower impedance. An electrolytic capacitor is more likely to attain an ESR lowering effect as a greater number of through holes are formed in its substrate.

Therefore, the inventors have taken notice of a configuration in which, in order to form a large number of through holes in a substrate extending in one direction, first and second electrodes extend along a longitudinal direction of the substrate and are arranged in a row in a direction intersecting the longitudinal direction, whereas the first and second outer electrodes on the rear side are arranged in conformity to the arrangement of the first and second electrodes.

However, such an arrangement narrows the gap between the first and second outer electrodes. The inventors have found that the workability at the time of mounting the capacitor onto the substrate is worsened thereby.

It is a second object of the present invention to provide a capacitor which exhibits a favorable workability at the time when being mounted onto the substrate.

(1) For achieving the first object, one aspect of the capacitor in accordance with the present invention comprises a capacitor device including an anode part and a cathode part; and a substrate including a device mounting region for mounting the capacitor device, the device mounting region extending in one direction. The substrate includes a main part formed with first and second conduction paths penetrating therethrough from a front face to a rear face; first and second electrodes disposed in the device mounting region on the front face, the first and second electrodes being connected to the anode and cathode parts, respectively; and first and second outer electrodes disposed on the rear face, the first and second outer electrodes being electrically connected to the first and second electrodes by way of the first and second conduction paths, respectively. The first and second electrodes are arranged in a row in a longitudinal direction of the device mounting region. The first and second outer electrodes include first and second connection areas for connecting with external wiring. The first and second connection areas extend in the longitudinal direction of the device mounting region, and are arranged in a row in a direction intersecting the longitudinal direction.

Since the first and second electrodes are arranged in a row in the longitudinal direction of the device mounting region, the configuration mentioned above allows the second electrode to occupy greater areas and the first electrode to occupy smaller areas in the device mounting region. This can enhance the area of the cathode part of the capacitor device mounted on the substrate, thereby increasing the capacitance of the capacitor.

The first and second connection areas extend in the longitudinal direction of the device mounting region and are arranged in a row in a direction intersecting the longitudinal direction. This can make the first and second connection areas longer in the longitudinal direction, thereby expanding the width of current paths and lowering the ESL.

Preferably, in the capacitor in accordance with the present invention, the area of the first outer electrode excluding the first connection area and the area of the second outer electrode excluding the second connection area are covered with an insulating material.

In this case, the capacitor is not connected to the external wiring in areas other than the first and second connection areas. Therefore, currents flow favorably in conformity to the forms of the first and second connection areas extending in the longitudinal direction of the device mounting region, whereby the ESL is likely to decrease as mentioned above.

Preferably, in the capacitor in accordance with the present invention, a plurality of first conduction paths align along a fringe of the first electrode on the second electrode side, whereas a plurality of second conduction paths align along a fringe of the second electrode on the first electrode side.

In this case, the distance between the first and second conduction paths becomes shorter, whereby their ESLs are likely to cancel each other out. Therefore, the total ESL tends to decrease. Further, since a plurality of first and second conduction paths are formed, the ESL is more likely to decrease.

Preferably, in the capacitor in accordance with the present invention, the first and second conduction paths are formed between the first and second connection areas, the first outer electrode includes a first conduction area extending from the first connection area to the second connection area so as to cover the area of the rear face formed with the first conduction path, the second outer electrode includes a second conduction area extending from the second connection area to the first connection area so as to cover the area of the rear face formed with the second conduction path, and the first and second conduction areas are arranged in a row in the longitudinal direction of the device mounting region. In this case, respective currents flowing through the first and second conduction areas are directed opposite from each other, whereby the ESL is likely to decrease.

Preferably, in the capacitor in accordance with the present invention, the second electrode has an area greater than that of the first electrode. Since the second electrode has a larger area, the cathode part of the capacitor device can attain a larger area in this case. This can enhance the capacitance of the capacitor.

(2) For achieving the second object, another aspect of the capacitor in accordance with the present invention comprises a capacitor device including an anode part and a cathode part; and a substrate including a device mounting region for mounting the capacitor device, the device mounting region extending in one direction. The substrate includes a main part formed with first and second conduction paths penetrating therethrough from a front face to a rear face; first and second electrodes disposed in the device mounting region on the front face, the first and second electrodes being connected to the anode and cathode parts, respectively; and first and second outer electrodes disposed on the rear face, the first and second outer electrodes being electrically connected to the first and second electrodes by way of the first and second conduction paths, respectively. The first and second electrodes extend in a longitudinal direction of the device mounting region and are arranged in a row in a direction intersecting the longitudinal direction. The first and second outer electrodes include first and second connection areas for connecting with external wiring. The first and second connection areas are arranged in a row in the longitudinal direction.

Since the first and second electrodes are arranged as mentioned above, a large number of first and second conduction paths can be formed in the longitudinal direction of the device mounting region. Since the first and second connection areas are arranged in a row in the longitudinal direction of the device mounting region, the distance between the first and second connection areas can be made longer. Therefore, the space between the first and second connection areas can be utilized for improving the workability when mounting the capacitor onto another circuit board or the like.

Preferably, in the capacitor in accordance with the present invention, the first connection area is formed on one end side of both longitudinal end parts of the device mounting region in a region of the rear face corresponding to the device mounting region, whereas the second connection area is formed on the other end side of both end parts. Since the gap between the first and second connection areas becomes wider, the workability at the time of mounting the substrate further improves in this case.

Preferably, in the capacitor in accordance with the present invention, the area of the first outer electrode excluding the first connection area and the area of the second outer electrode excluding the second connection area are covered with an insulating material. In this case, substantially the whole area other than the first and second connection areas can be utilized for improving the workability as mentioned above.

Preferably, in the capacitor in accordance with the present invention, a plurality of first conduction paths align along a fringe of the first electrode on the second electrode side, whereas a plurality of second conduction paths align along a fringe of the second electrode on the first electrode side. In this case, since the first and second conduction paths are formed as mentioned above, the distance between the first and second conduction paths becomes shorter, whereby the ESL decreases. Further, since a large number of first and second conduction paths are formed as mentioned above, the ESL is more likely to decrease.

Preferably, in the capacitor in accordance with the present invention, the first and second conduction paths are arranged in a row in a direction substantially orthogonal to the longitudinal direction of the device mounting region. Since the first and second conduction paths further approach each other, the ESL is more likely to decrease in this case.

Preferably, in the capacitor in accordance with the present invention, the first and second conduction paths are formed between the first and second connection areas, the first outer electrode includes a first conduction area extending from the first connection area to the second connection area so as to cover the area of the rear face formed with the first conduction path, the second outer electrode includes a second conduction area extending from the second connection area to the first connection area so as to cover the area of the rear face formed with the second conduction path, and the first and second conduction areas are arranged in a row in a direction intersecting the longitudinal direction of the device mounting region. In this case, respective currents flowing through the first and second conduction areas are directed opposite from each other, whereby the ESL is likely to decrease.

BRIEF DESCRIPTION OF THE DRAWINGS

FIG. 3 is a schematic view showing the cross-sectional configuration of the capacitor taken along the line III—III of FIG. 1;

FIG. 4A is a plan view of a substrate on the front face side, whereas

FIG. 5A is a plan view of a substrate in which first and second electrodes are arranged in a row in a direction substantially orthogonal to the longitudinal direction of the substrate, whereas

FIG. 6 is a schematic perspective view of the capacitor in accordance with a second embodiment;

FIG. 9A is a plan view of a substrate on the side mounted with the capacitor device, whereas

DESCRIPTION OF THE PREFERRED EMBODIMENTS

In the following, preferred embodiments of the present invention will be explained in detail with reference to the accompanying drawings.

Figure 1:
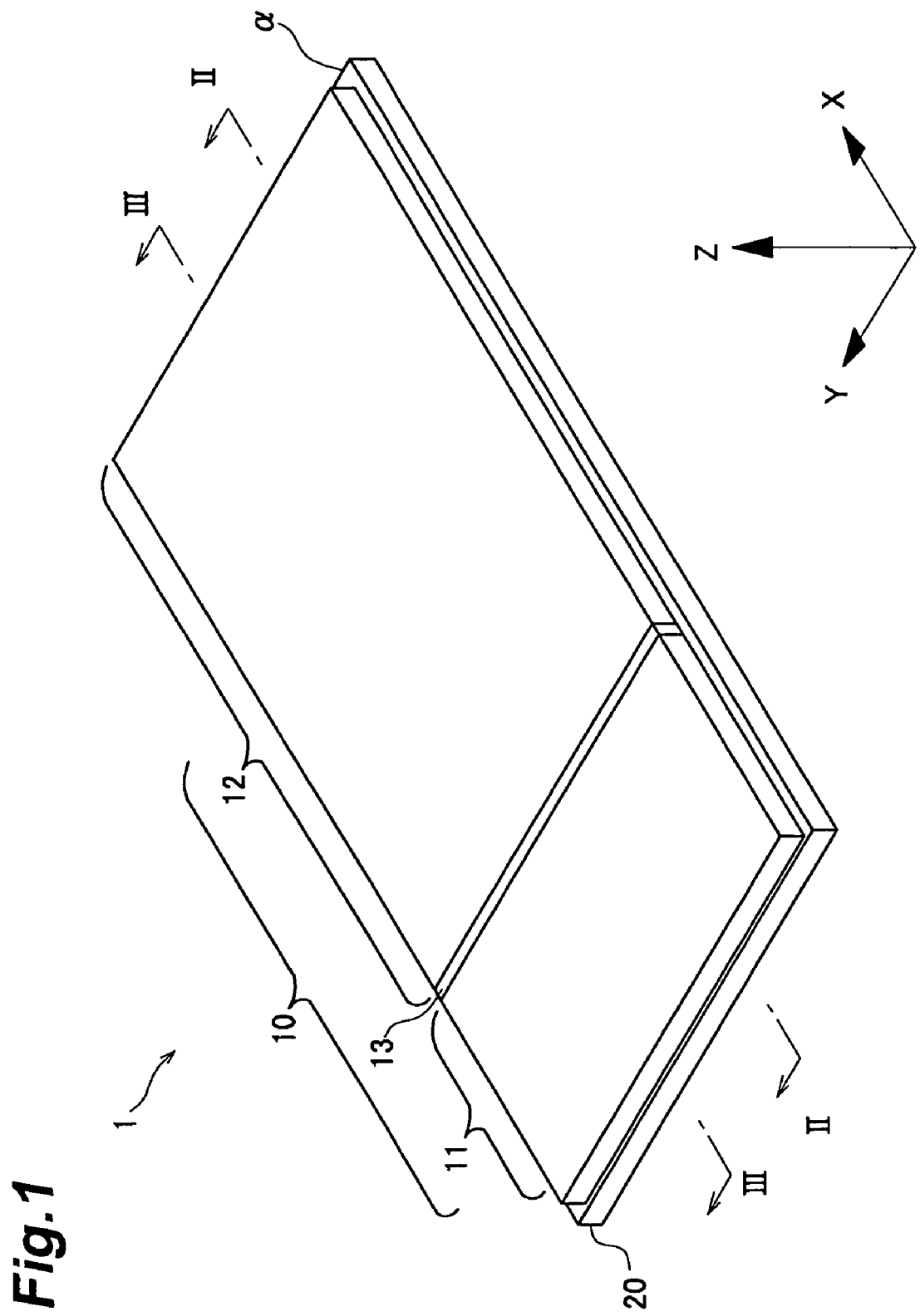
FIG. 1 is a schematic perspective view of the capacitor in accordance with a first embodiment.

[First Embodiment] FIG. 1 is a schematic perspective view showing the capacitor in accordance with this embodiment. As shown in FIG. 1, the capacitor 1 comprises a capacitor device 10, and a substrate 20 including a device mounting region α which is a region for mounting the capacitor device 10 and extends in one direction. In this embodiment, the capacitor 1 is an electrolytic capacitor. Since the substrate 20 is formed like a substantially rectangular strip extending in one direction as shown in FIG. 1, the region defined by the outer perimeter of the substrate 20 corresponds to the device mounting region α.

The longer side direction of the substrate (the longitudinal direction of the device mounting region) is defined as X direction, the shorter side direction thereof is defined as Y direction, and a direction orthogonal to the X and Y directions is defined as Z direction in the following explanation in this specification.

The capacitor device 10 includes an anode part 11 and a cathode part 12. The cathode part 12 has a substantially rectangular strip form extending in the X direction as shown in FIG. 1. The anode part 11 extends outward (in the −X direction) from a fringe of the cathode part 12 extending in the Y direction. An insulating part 13 made of an insulating material is disposed between the anode part 11 and cathode part 12 in order to prevent them from short-circuiting.

Figure 2:
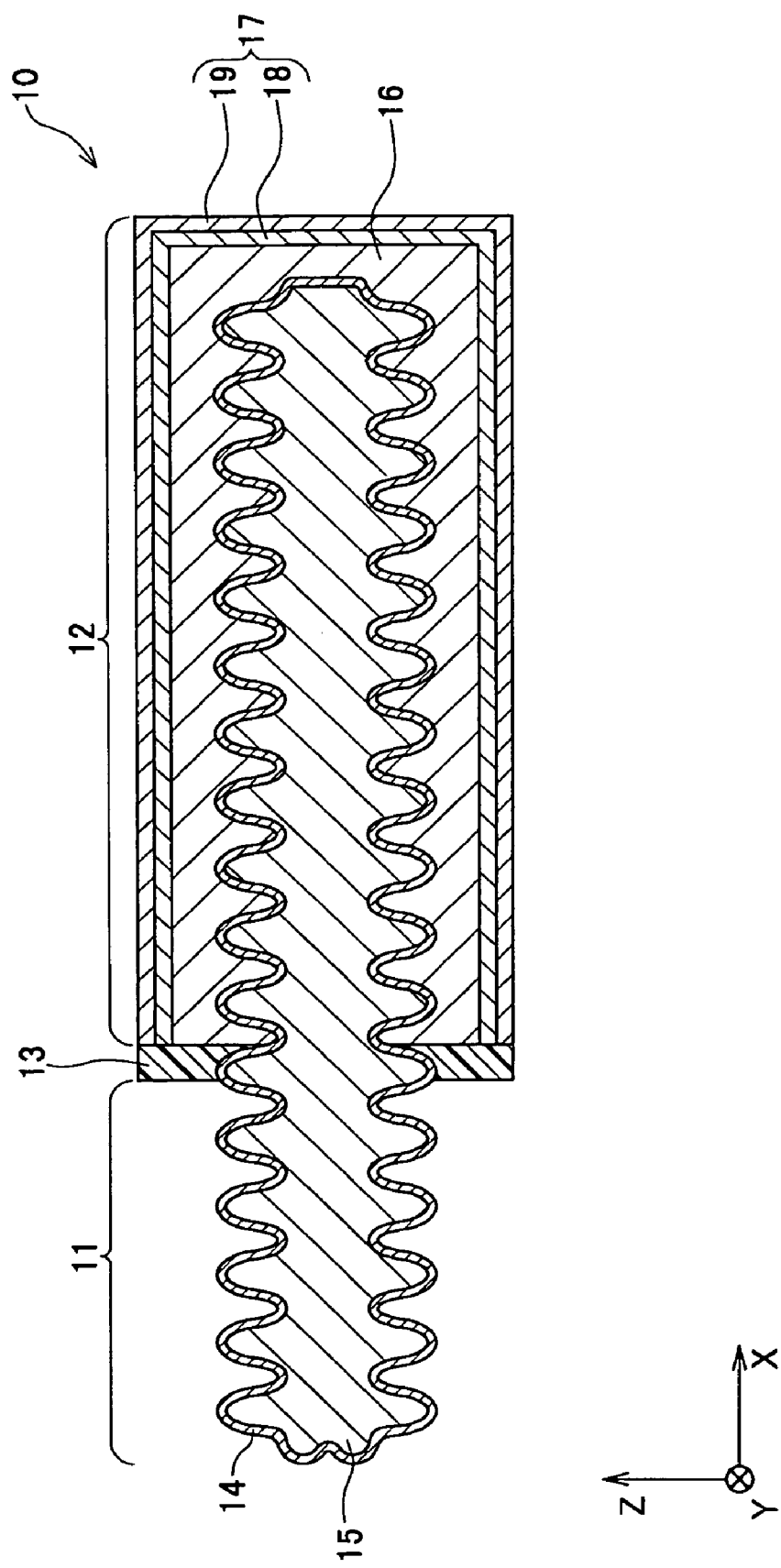
FIG. 2 is a schematic view showing the cross-sectional configuration of the capacitor device taken along the line II—II of FIG. 1.

FIG. 2 is a schematic view showing the cross-sectional configuration of the capacitor device 10 taken along the line II—II of FIG. 1.

The anode part 11 is constituted by a partial region of an aluminum support (valve metal support) 15 having a surface layer formed with a dielectric layer 14. The dielectric layer 14 is an aluminum oxide coating, which is formed by roughening (expanding the surface of) the aluminum support 15 by etching and then subjecting it to a chemical process, i.e., anode oxidization.

The cathode part 12 is constituted by an electrolyte layer 16 covering the region of the aluminum support 15 excluding the anode part 11, and a conductor layer 17 formed about the electrolyte layer 16.

The electrolyte layer 16 includes a conductive polymer compound. The electrolyte layer 16 is formed by impregnating the depressions of the roughened surface of the aluminum support 15 with a material to become the electrolyte layer 16 in a monomer state, and then subjecting the material to chemical oxidative polymerization or electrolytic oxidative polymerization.

The conductor layer 17 is constructed by a graphite paste layer 18 and a silver paste layer 19 which are successively formed on the electrolyte layer 16 by any of screen printing, dipping, and spray coating, for example. In the capacitor device 10, the electrolyte layer 16 and conductor layer 17 function as a cathode.

Figure 4A:
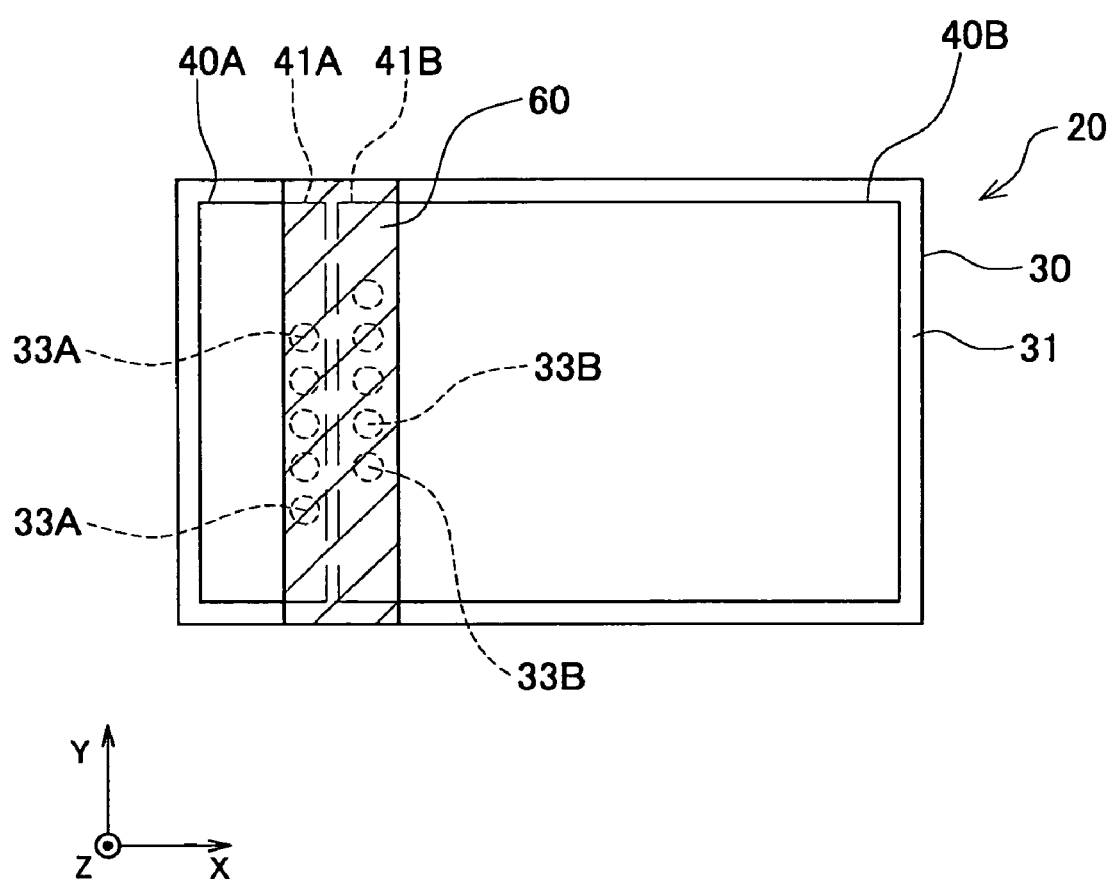
Figure 4B:
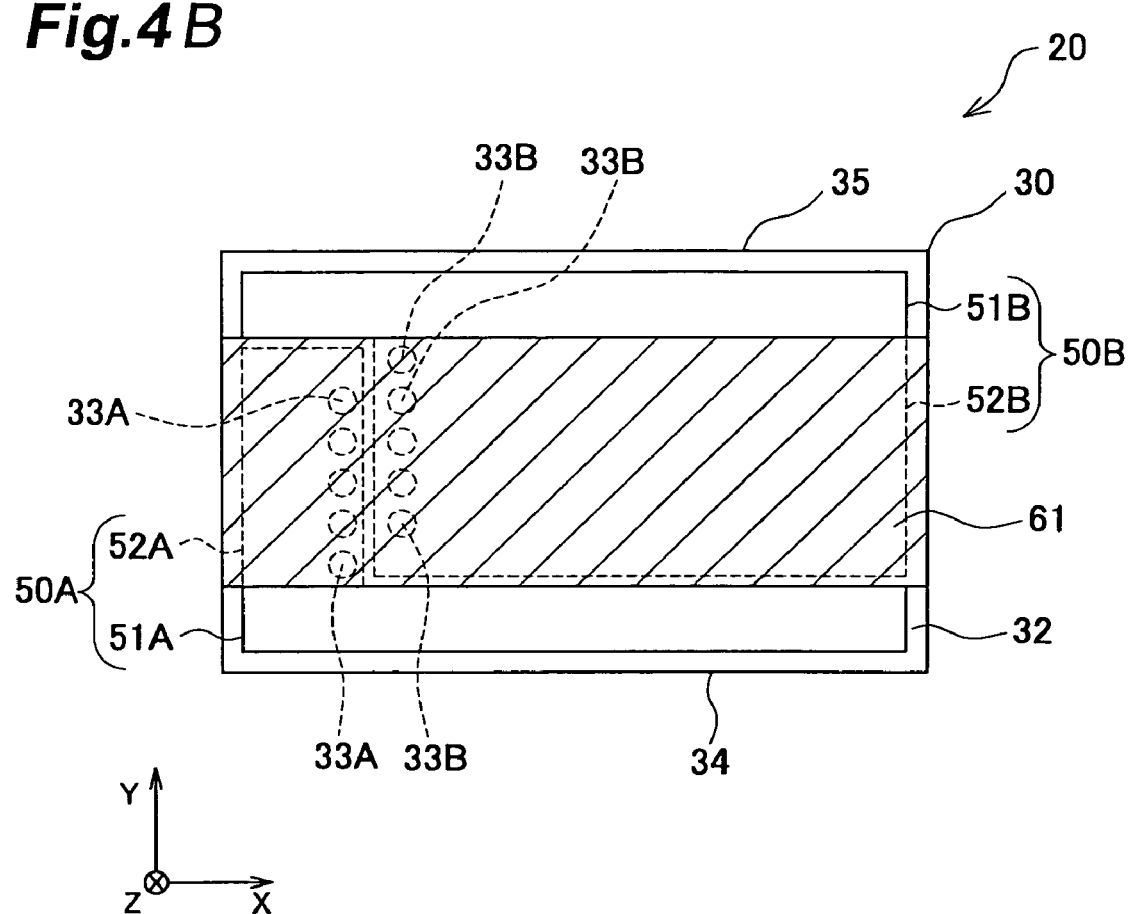
FIG. 4B is a plan view of the substrate on the rear face side.

Next, with reference to FIGS. 3, 4A, and 4B, the substrate 20 for mounting the capacitor device 10 will be explained. FIG. 3 is a schematic view showing the cross-sectional configuration of the capacitor 1 taken along the line III—III of FIG. 1. FIG. 4A is a plan view of the substrate 20 on the front face 31 side. FIG. 4B is a plan view of the substrate 20 on the rear face 32 side.

The substrate 20 includes a main part 30 having a substantially rectangular strip form made of an epoxy resin. In the following, the surface of the main part 30 on the side mounted with the capacitor device 10 will be referred to as the front face 31, whereas the surface on the side opposite from the front face 31 will be referred to as the rear face 32.

The substrate 20 is a printed wiring board having the front face 31 printed with a first electrode 40A and a second electrode 40B which are made of copper, and the rear face 32 printed with a first outer electrode 50A and a second outer electrode 50B which are made of copper.

The first electrode 40A is connected to the anode part 11 of the capacitor device 10. The first electrode 40A and the first outer electrode 50A are electrically connected to each other by way of through holes (first conduction paths) 33A penetrating through the main part 30 from the front face 31 to the rear face 32. The second electrode 40B is connected to the cathode part 12 of the capacitor device 10. The second electrode 40B and the second outer electrode 50B are electrically connected to each other by way of through holes (second conduction paths) 33B penetrating through the main part 30 from the front face 31 to the rear face 32.

As shown in FIGS. 3 and 4A, a plurality of through holes 33A are formed along a fringe 41A of the first electrode 40A on the second electrode 40B side while in contact with the fringe 41A. A plurality of through holes 33B are formed along a fringe 41B of the second electrode 40B on the first electrode 40A side while in contact with the fringe 41B. In other words, a plurality of through holes 33A, 33B are positioned on both sides of the boundary between the first electrode 40A and second electrode 40B and are arranged in rows in the Y direction. The through holes 33A, 33B are constructed by holes which penetrate through the main part 30 from the front face 31 to the rear face 32 and are filled with a conductive material.

As shown in FIG. 4A, the first electrode 40A and second electrode 40B, each having a substantially rectangular form, are arranged in a row in the longitudinal direction (X direction) of the substrate 20. The length of the second electrode 40B in the X direction is longer than that of the first electrode 40A in the X direction, whereby the area occupied by the second electrode 40B in the front face 31 is greater than the area occupied by the first electrode 40A therein.

The first electrode 40A and second electrode 40B are covered with an insulating film 60 (a hatched part in FIG. 4A) made of an insulating material such as solder resist from the fringe 41A to the fringe 41B. The insulating film 60 also enters the gap (boundary) between the first electrode 40A and the second electrode 40B. Providing the insulating film 60 as such prevents the cathode part 12 and anode part 11 from short-circuiting with the first electrode 40A and second electrode 40B, respectively, when mounting the capacitor device 10 onto the substrate 20. The insulating film 60 is formed such that its width in the Y direction is greater than the width of the first and second electrodes 40A, 40B, and thus covers the front face 31 as well.

As shown in FIG. 4B, each of the first outer electrode 50A and second outer electrode 50B has a substantially L form. The first outer electrode 50A and second outer electrode 50B are arranged so as to mate with each other. However, the first and second outer electrodes 50A, 50B are separated from each other.

The first and second outer electrodes 50A, 50B are covered with a rectangular insulating film 61 (a hatched part in FIG. 4B) extending in the X direction while including their boundary and regions covering the through holes 33A, 33B. The insulating film 61 also enters the gap (boundary) between the first and second outer electrodes 50A, 50B in order to electrically insulate the first and second outer electrodes 50A, 50B from each other more reliably. The insulating film 61 is formed such that its width in the X direction is greater than the width of the first and second outer electrodes 50A, 50B, so as to cover the end part of the rear face 32 partly.

The area of the first outer electrode 50A not covered with the insulating film 61, i.e., exposed area, is a first connection area 51A to connect with wiring (e.g., another circuit board) on the outside of the system (i.e., the outside of the capacitor 1). The area of the second outer electrode 50B not covered with the insulating film 61, i.e., exposed area, is a second connection area 51B to connect with wiring on the outside of the system.

The first connection area 51A is formed on one end part 34 side of a pair of end parts 34, 35 extending in the X direction on the rear face 32, so as to extend in the X direction (longitudinal direction). The second connection area 51B is formed on the end part 35 side paired with the end part 34, so as to extend in the X direction. The first connection area 51A and second connection area 51B are arranged in a row in a direction substantially orthogonal to the longitudinal direction of the substrate 20. The length of each of the first and second connection areas 51A and 51B in the X direction is substantially equal to the length of the substrate 20 in the X direction.

In the first outer electrode 50A, the area other than the first connection area 51A is a first conduction area 52A directly connected to a plurality of through holes 33A. The first conduction area 52A extends from the first connection area 51A to the second connection area 51B so as to cover the area formed with a plurality of through holes 33A in the rear face 32. In this embodiment, the first conduction area 52A is orthogonal to the first connection area 51A.

In the second outer electrode 50B, the area other than the second connection area 51B is a second conduction area 52B directly connected to a plurality of through holes 33B. The second conduction area 52B extends from the second connection area 51B to the first connection area 51A so as to cover the area formed with a plurality of through holes 33B in the rear face 32. In this embodiment, the second conduction area 52B is orthogonal to the second connection area 51B.

As shown in FIG. 4B, the first conduction area 52A and second conduction area 52B are arranged in a row in the X direction and are covered with the insulating film 61.

A method of making the capacitor 1 (see FIG. 1) by mounting the capacitor device 10 onto the substrate 20 will now be explained. First, the capacitor device 10 is mounted on the substrate 20 such that the anode part 11 and cathode part 12 of the capacitor device 10 come into contact with the first electrode 40A and second electrode 40B, respectively.

Next, the cathode part 12 and the second electrode 40B are connected to each other with a conductive adhesive, for example. This electrically connects the cathode part 12 and the second electrode 40B to each other. Since the second electrode 40B is electrically connected to the second outer electrode 50B by way of the through holes 33B, the cathode part 12 and the second outer electrode 50B are electrically connected to each other.

Subsequently, the anode part 11 and the first electrode 40A are connected to each other by metal welding means such as YAG laser spot welding. As a consequence, the aluminum support 15 constituting the anode part 11 and the first electrode 40A are electrically connected to each other. Since the first electrode 40A is electrically connected to the first outer electrode 50A by way of the through holes 33A, the aluminum support 15 and the first outer electrode 50A are electrically connected to each other.

When external wiring is connected to the first connection area 51A and second connection area 51B, the capacitor device 10 can be charged and discharged.

Since the first electrode 40A and second electrode 40B are arranged in a row in the longitudinal direction of the substrate 20, the capacitor device 10 (see FIG. 1) in which the anode part 11 and cathode part 12 are arranged similarly can favorably be mounted thereon.

Figure 5B:
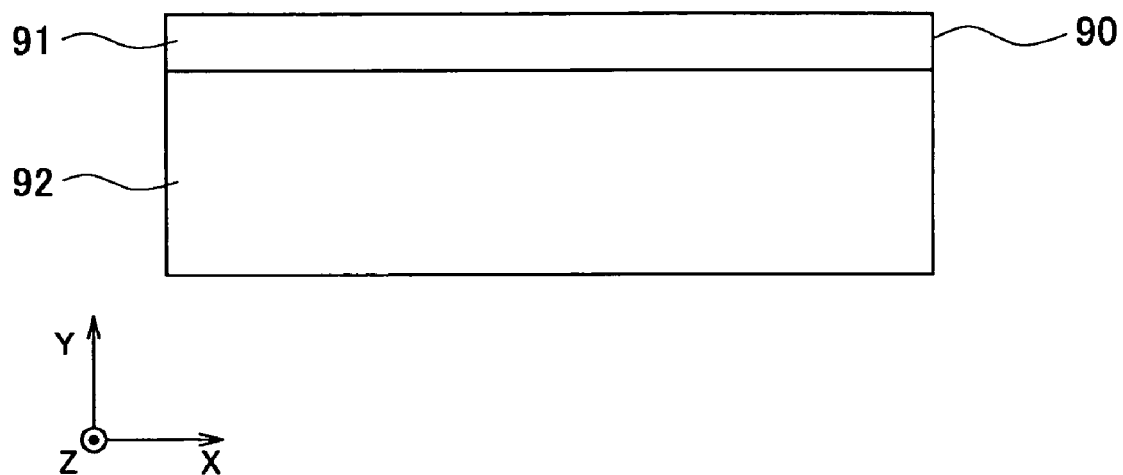
FIG. 5B is a plan view of the capacitor device mounted on the substrate shown in FIG. 5A.

Meanwhile, a capacitor device 90 shown in FIG. 5B is favorably mounted on a substrate 80 in which first and second electrodes 70A, 70B are arranged in a row in the Y direction as shown in the comparative example (different from an embodiment of the present invention) of FIG. 5A. Namely, the capacitor device 90 in which an anode part 91 and a cathode part 92 are arranged in a direction substantially orthogonal to the longitudinal direction of the substrate 20 is mounted on the substrate 80.

Assuming that the anode part projects from the cathode part by a fixed length, the cathode part can attain a greater area in the case where the anode part 11 and the cathode part 12 are arranged in the longitudinal direction of the capacitor device 10 as shown in FIG. 1 than in the case where the anode part 90 and the cathode part 92 are arranged in a direction orthogonal to the longitudinal direction as shown in FIG. 5B. Therefore, the capacitor device 10 yields a capacitance greater than that of the capacitor device 90. Hence, the capacitance of the capacitor 1 can be enhanced when the substrate 20 of this embodiment is used.

Operations and effects due to the forming of the first connection area 51A and second connection area 51B will now be explained.

Normally, first and second outer electrodes are formed so as to correspond to the arrangement pattern of the first electrode 40A and second electrode 40B on the front face 31. Therefore, when the first electrode 40A and second electrode 40B are arranged in a row in the longitudinal direction in order to increase the capacitance as mentioned above, the first and second outer electrodes have conventionally been arranged in the longitudinal direction as well.

In such an arrangement pattern, the length of the first and second outer electrodes is limited by the length of the substrate in the shorter side direction.

In this embodiment, by contrast, the length of each of the first and second connection areas 51A, 51B substantially equals the longitudinal length of the substrate 20. Since the width of current paths can be made larger than that conventionally available as such, the ESR and ESL can be lowered.

The through holes 33A, 33B are disposed under the fringes 41A, 41B, and thus are close to each other. As a consequence, their respective ESLs are more likely to cancel each other out, thereby further reducing the total ESL. From the viewpoint of reducing the ESL, it will be preferred if the through holes 33A and through holes 33B are arranged in a row in a direction (X direction) substantially orthogonal to the fringe 41A (or fringe 41B).

Further, since the first conduction area 52A and the second conduction area 52B are formed as mentioned above, respective currents flowing through the first conduction area 52A and second conduction area 52B are directed opposite from each other, whereby the ESL is likely to decrease.

Though the first embodiment of the present invention is explained in the foregoing, the present invention is not limited thereto. For example, though an aluminum support is used as the valve metal support, any support constituted by a metal acting like a valve such as tantalum, niobium, titanium, hafnium, zirconium, zinc, tungsten, bismuth, or antimony may be employed.

Though the through holes 33A, 33B are constituted by holes penetrating through the main part 30 from the front face 31 to the rear face 32 filled with a conductive material, a conductive layer made of a conductive material may be formed on only the inner wall face of the holes, for example. Though a plurality of through holes 33A, 33B are formed on both sides of the boundary between the first and second electrodes 40A, 40B, this is not restrictive. It will be sufficient if the through hole 33A electrically connects the first electrode 40A and the first outer electrode 50A to each other, and the through hole 33B electrically connects the second electrode 40B and the second outer electrode 50B to each other. However, the arrangement of this embodiment (see FIG. 4A) is preferred from the viewpoint of further lowering the ESL as mentioned above.

It is not always necessary for the first outer electrode 50A and second outer electrode 50B to have a substantially L-like form. In the first outer electrode 50A, the first conduction area 52A may have such a length (width) in the X direction as to cover a plurality of through holes 33A, while yielding a convex form extending from the first connection area 51A to the second connection area 51B. The same holds for the second outer electrode 50B. When the first conduction area 52A has such a width as to cover the through holes 33A while the second conduction area 52B has such a width as to cover the through holes 33B, it is not necessary for the insulating film 61 to cover the first and second outer electrodes 50A, 50B in order to form the first and second connection areas 51A, 51B.

Though explained as a substantially rectangular strip, the form of the substrate 20 is not restricted in particular. It will be sufficient if the substrate 20 has a device mounting region which is a region, extending in one direction, for mounting the capacitor device 10. When the substrate (i.e., substrate main part) does not have a substantially rectangular strip form, it will be sufficient if the first and second conduction paths are formed within the device mounting region in the substrate main part, and the first and second electrodes are disposed in this region.

The anode part 11 and cathode part 12 in the capacitor device 10 are not limited to modes shown in FIGS. 1 to 3. For example, a lead or the like may be drawn out of the cathode part 12 having a substantially rectangular strip form, and the cathode part 12 and the lead may be employed as one cathode part. The same holds for the anode part 11.

Though an electrolytic capacitor is preferred, the capacitor 1 is not limited to the electrolytic capacitor in particular, but may be any capacitor as long as it is used while being mounted to a device mounting region extending in one direction.

[Second Embodiment] Next, the second embodiment of the capacitor in accordance with the present invention will be explained. FIG. 6 is a schematic sectional view showing the capacitor of this embodiment. As shown in FIG. 6, this capacitor 101 comprises a capacitor device 110, and a substrate 120 including a device mounting region α which is a region for mounting the capacitor device 110 and extends in one direction. In this embodiment, the capacitor 101 is an electrolytic capacitor. Since the substrate 120 is formed like a substantially rectangular strip extending in one direction as shown in FIG. 6, the region defined by the outer perimeter of the substrate 120 corresponds to the device mounting region α.

The capacitor device 110 includes an anode part 111 and a cathode part 112. The cathode part 112 has a substantially rectangular strip form extending in the X direction as shown in FIG. 6. The anode part 111 extends outward (in the Y direction) from a fringe of the cathode part 112 extending in the X direction. An insulating part 113 made of an insulating material is disposed between the anode part 111 and cathode part 112 in order to prevent them from short-circuiting.

Figure 7:
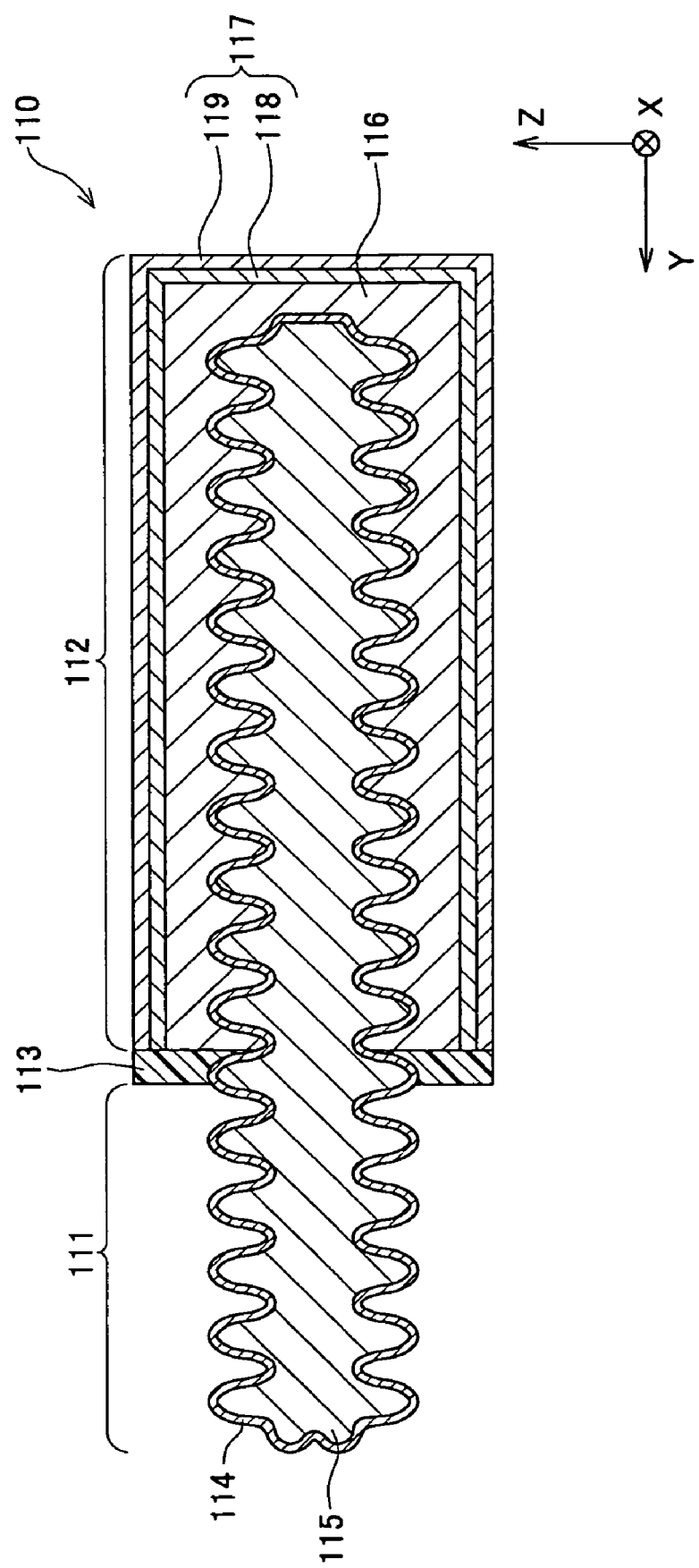
FIG. 7 is a schematic view showing the cross-sectional configuration of the capacitor device taken along the line VII—VII of FIG. 6.

FIG. 7 is a schematic view showing the cross-sectional configuration of the capacitor device 110 taken along the line VII—VII of FIG. 6.

The anode part 111 is constituted by a partial region of an aluminum support (valve metal support) 115 having a surface layer formed with a dielectric layer 114. The dielectric layer 114 is an aluminum oxide coating, which is formed by roughening (expanding the surface of) the aluminum support 15 by etching and then subjecting it to a chemical process, i.e., anode oxidization.

The cathode part 112 is constituted by an electrolyte layer 116 covering the region of the aluminum support 115 excluding the anode part 111, and a conductor layer 117 formed about the electrolyte layer 116.

The electrolyte layer 116 includes a conductive polymer compound. The electrolyte layer 116 is formed by impregnating the depressions of the roughened surface of the aluminum support 115 with a material to become the electrolyte layer 116 in a monomer state, and then subjecting the material to chemical oxidative polymerization or electrolytic oxidative polymerization.

The conductor layer 117 is constructed by a graphite paste layer 118 and a silver paste layer 119 which are successively formed on the electrolyte layer 116 by any of screen printing, dipping, and spray coating, for example. In the capacitor device 110, the electrolyte layer 116 and conductor layer 117 function as a cathode.

Figure 8:
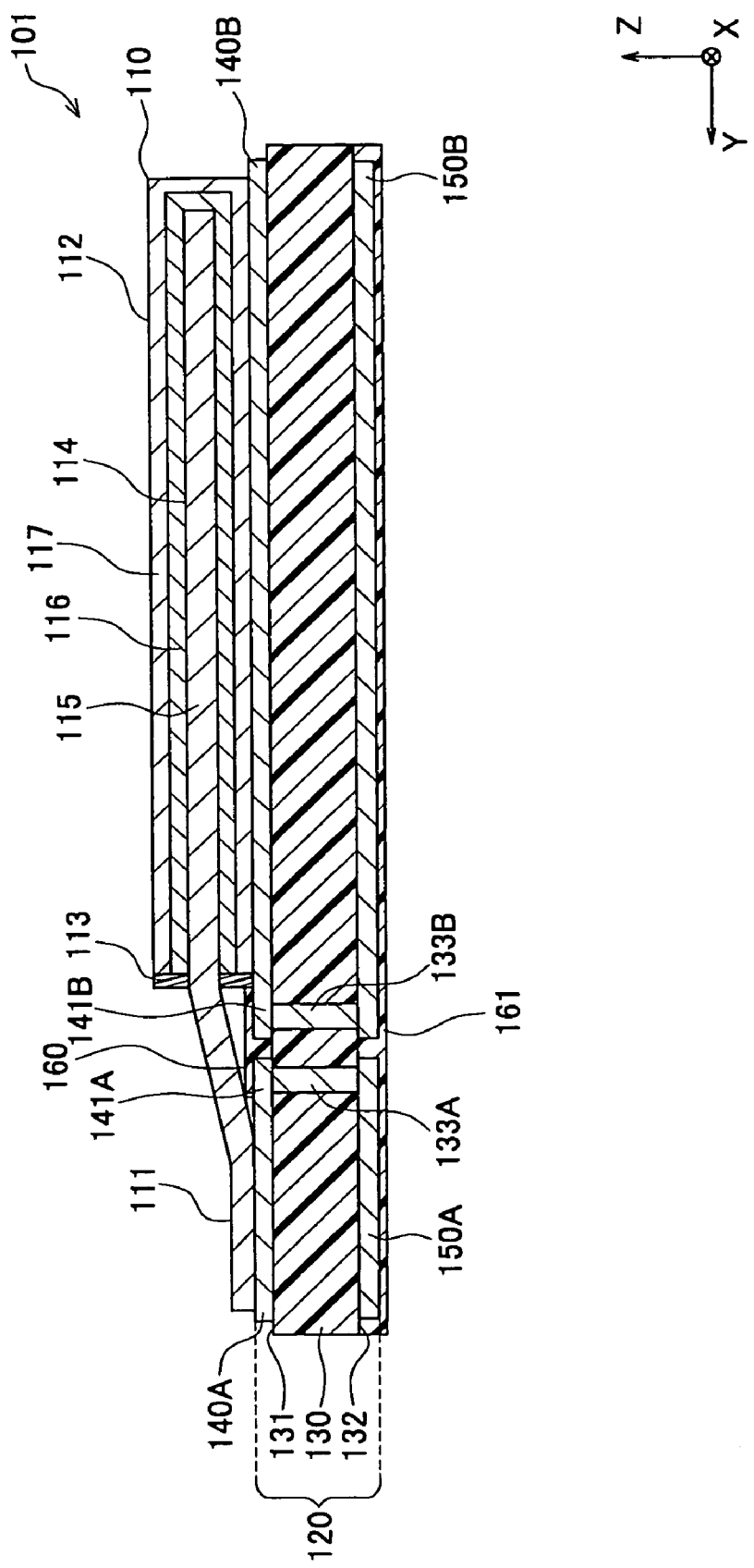
FIG. 8 is a schematic view showing the cross-sectional configuration of the capacitor taken along the line VIII—VIII of FIG. 6.
Figure 9A:
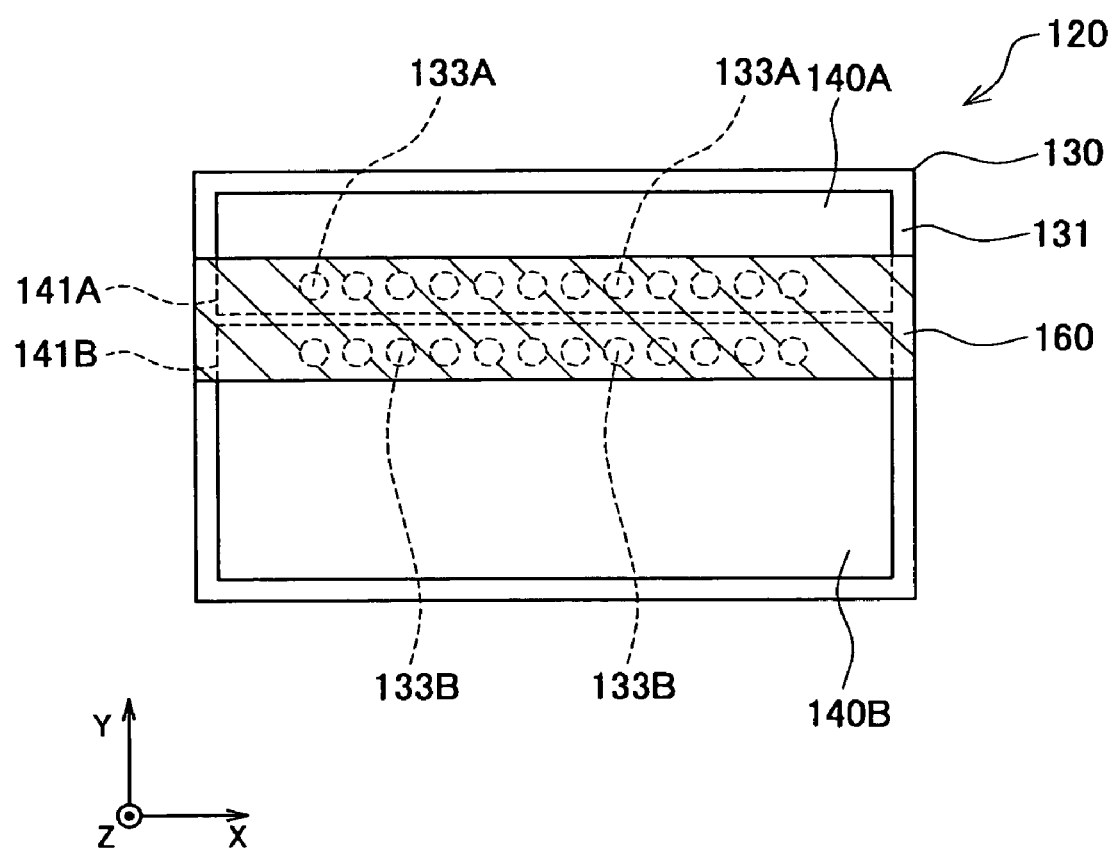
Figure 9B:
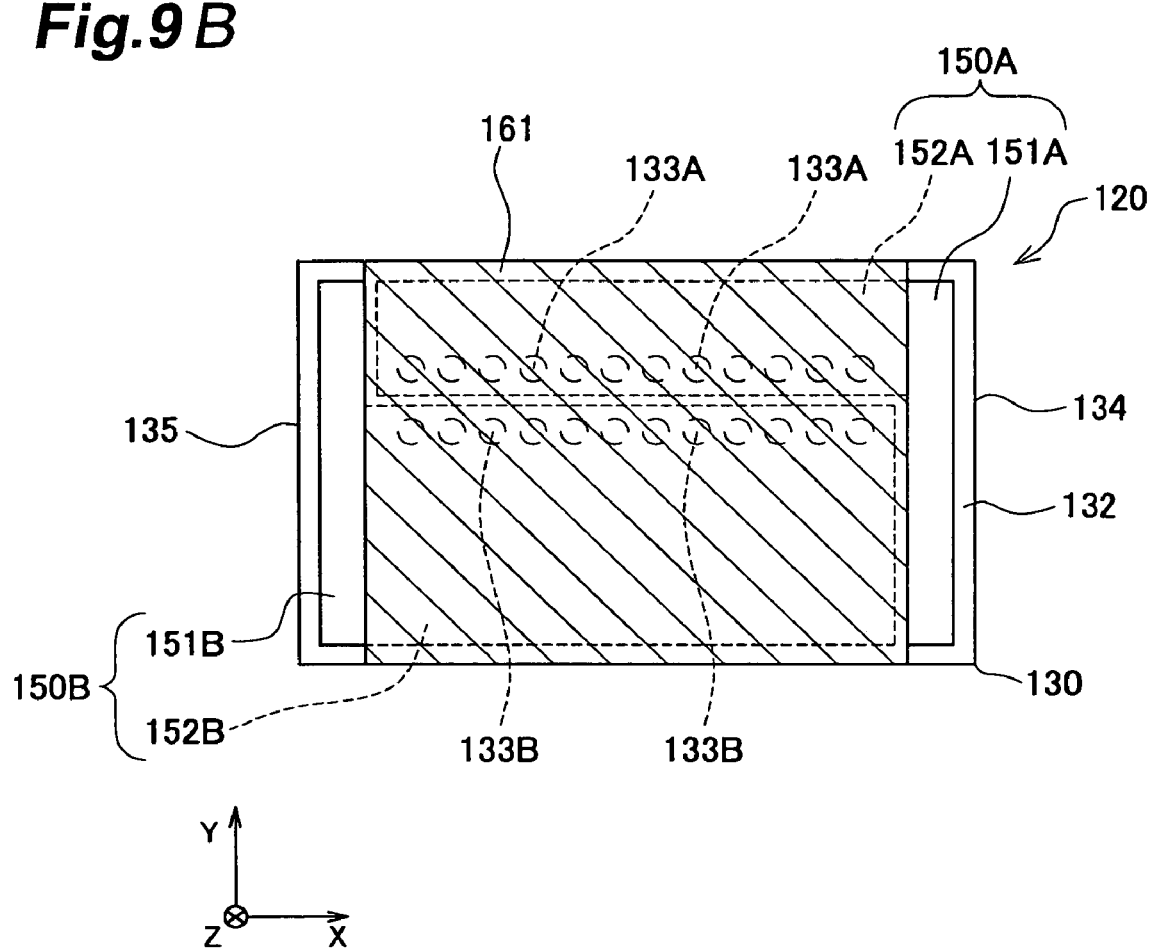
FIG. 9B is a plan view of the substrate on the side opposite from FIG. 9A.

Next, with reference to FIGS. 8, 9A, and 9B, the substrate 120 for mounting the capacitor device 110 will be explained. FIG. 8 is a schematic view showing the cross-sectional configuration of the capacitor 101 taken along the line VIII—VIII of FIG. 6. FIG. 9A is a plan view of the substrate 120 on the side mounted with the capacitor device 110. FIG. 9B is a plan view of the substrate 120 on the side opposite from that of FIG. 9A.

The substrate 120 includes a main part 130 having a substantially rectangular strip form made of an epoxy resin. In the following, the surface of the main part 130 on the side mounted with the capacitor device 110 will be referred to as the front face 131, whereas the surface on the side opposite from the front face 131 will be referred to as the rear face 132.

The substrate 120 is a printed wiring board having the front face 131 printed with a first electrode 140A and a second electrode 140B which are made of copper, and the rear face 132 printed with a first outer electrode 150A and a second outer electrode 150B which are made of copper.

The first electrode 140A is connected to the anode part 111 of the capacitor device 110. The first electrode 140A and the first outer electrode 150A are electrically connected to each other by way of through holes (first conduction paths) 133A penetrating through the main part 130 from the front face 131 to the rear face 132. The second electrode 140B is connected to the cathode part 112 of the capacitor device 110. The second electrode 140B and the second outer electrode 150B are electrically connected to each other by way of through holes (second conduction paths) 133B penetrating through the main part 130 from the front face 131 to the rear face 132.

As shown in FIGS. 8 and 9A, a plurality of through holes 133A are arranged in the X direction while in contact with a fringe 141A of the first electrode 140A on the second electrode 140B side. A plurality of through holes 133B are arranged in the X direction while in contact with a fringe 141B of the second electrode 140B on the first electrode 140A side. Each pair of through holes 133A and 133B are arranged in a row in the Y direction. The through holes 133A, 133B are constructed by holes which penetrate through the main part 130 from the front face 131 to the rear face 132 and are filled with a conductive material.

As shown in FIG. 9A, the first electrode 140A and second electrode 140B, each having a substantially rectangular form, are arranged in the Y direction. The length of the second electrode 140B in the Y direction is longer than that of the first electrode 140A in the Y direction, whereby the area occupied by the second electrode 140B in the front face 131 is greater than the area occupied by the first electrode 140A therein.

The first electrode 140A and second electrode 140B are covered with an insulating film 160 (a hatched part in FIG. 9A) made of an insulating material such as solder resist from the fringe 141A to the fringe 141B. The insulating film 160 enters the gap (boundary) between the first electrode 140A and the second electrode 140B. Providing the insulating film 160 as such prevents the cathode part 112 and anode part 111 from short-circuiting with the first electrode 140A and second electrode 140B, respectively, when mounting the capacitor device 110 onto the substrate 120. The insulating film 160 is formed such that its width in the X direction is greater than the width of the first and second electrodes 140A, 140B, and thus covers the front face 131 as well.

As shown in FIG. 9B, each of the first outer electrode 150A and second outer electrode 150B has a substantially L form. The first outer electrode 150A and second outer electrode 150B are arranged so as to mate with each other. However, the first and second outer electrodes 150A, 150B are separated from each other.

The first and second outer electrodes 150A, 150B are covered with a rectangular insulating film 161 (a hatched part in FIG. 9B) extending in the Y direction while including their boundary and regions covering the through holes 133A, 133B. The insulating film 161 also enters the gap (boundary) between the first and second outer electrodes 150A, 150B in order to electrically insulate the first and second outer electrodes 150A, 150B from each other more reliably. The insulating film 161 is formed such that its width in the Y direction is greater than the width of the first and second outer electrodes 150A, 150B, and thus covers the rear face 132 as well.

The area of the first outer electrode 150A not covered with the insulating film 161, i.e., exposed area, is a first connection area 151A to connect with wiring (e.g., another circuit board) on the outside of the system (i.e., the outside of the capacitor 101). The area of the second outer electrode 150B not covered with the insulating film 161, i.e., exposed area, is a second connection area 151B to connect with wiring on the outside of the system.

The first connection area 151A is formed on one end part 134 side of a pair of longitudinal end parts 134, 135 in the device mounting region α on the rear face 132, so as to extend in the Y direction. In this embodiment, the whole rear face 132 is a region corresponding to the device mounting region α. The second connection area 151B is formed on the end part 135 side paired with the end part 134, so as to extend in the Y direction. The first connection area 151A and second connection area 151B are arranged in a row in the longitudinal direction of the substrate 120. The length of each of the first and second connection areas 151A and 151B in the Y direction is substantially equal to the length of the substrate 120 in the Y direction.

In the first outer electrode 150A, the area other than the first connection area 151A is a first conduction area 152A directly connected to a plurality of through holes 133A. The first conduction area 152A extends from the first connection area 151A to the second connection area 151B so as to cover the area formed with a plurality of through holes 133A in the rear face 132.

In the second outer electrode 150B, the area other than the second connection area 151B is a second conduction area 152B directly connected to a plurality of through holes 133B. The second conduction area 152B extends from the second connection area 151B to the first connection area 151A so as to cover the area formed with a plurality of through holes 133B in the rear face 132.

As shown in FIG. 9B, the first conduction area 152A and second conduction area 152B are arranged in a row in the Y direction and are covered with the insulating film 161.

A method of making the capacitor 101 (see FIG. 6) by mounting the capacitor device 110 onto the substrate 120 will now be explained. First, the capacitor device 110 is mounted on the substrate 120 such that the anode part 111 and cathode part 112 of the capacitor device 110 come into contact with the first electrode 140A and second electrode 140B, respectively.

Next, the cathode part 112 and the second electrode 140B are connected to each other with a conductive adhesive, for example. This electrically connects the cathode part 112 and the second electrode 140B to each other. Since the second electrode 140B is electrically connected to the second outer electrode 150B by way of the through holes 133B, the cathode part 112 and the second outer electrode 150B are electrically connected to each other.

Subsequently, the anode part 111 and the first electrode 140A are connected to each other by metal welding means such as YAG laser spot welding. As a consequence, the aluminum support 115 constituting the anode part 111 and the first electrode 140A are electrically connected to each other. Since the first electrode 140A is electrically connected to the first outer electrode 150A by way of the through holes 133A, the aluminum support 115 and the first outer electrode 150A are electrically connected to each other.

When external wiring is connected to the first connection area 151A and second connection area 151B, the capacitor device 110 can be charged and discharged.

In this capacitor 101, the through holes 133A, 133B are arranged as mentioned above and thus are closer to each other, whereby the ESL is lowered. Also, since the first electrode 140A and second electrode 140B extend in the longitudinal direction of the substrate 120, a greater number of through holes 133A, 133B can be provided. Therefore, the ESL is further lowered.

Assuming that the length of the first electrode 140A (the length in the Y direction in FIG. 9A) in a direction orthogonal to its extending direction is fixed, the area of the first electrode 140A becomes greater when extending in the X direction than in the Y direction. Therefore, the arrangement of FIG. 9A enhances the connection strength between the first electrode 140A and anode part 111.

Operations and effects due to the first and second connection areas 151A, 151B arranged in a row in the X direction will now be explained.

In this case, the distance between the first and second connection areas 151A, 151B can be elongated, whereby the area covered with the insulating film 161 can be made larger. This can secure a larger working area, thereby improving the workability at the time of mounting the capacitor 101 to other circuit boards or the like.

For example, a phenomenon so-called "tower" has been known, in which, when mounting a capacitor to a circuit board by reflow soldering, the capacitor erects with respect to the mounting surface of the circuit board as the temperature in the surroundings of the capacitor rises. Since the gap between the first and second connection areas 151A, 151B is wide in the capacitor 101, an adhesive can easily be applied thereto. This can solder the capacitor 101 onto the circuit board while being fixed with the adhesive, and thus can prevent the tower from occurring and make it easier to mount the capacitor 101 to the circuit board. When manually mounting the capacitor 101 to the circuit board and so forth, the wide area covered with the insulating film 161 can be utilized such as to hold the capacitor 101 with tweezers or the like at the time of soldering, whereby the soldering becomes easier.

Meanwhile, the first and second outer electrodes are usually formed in conformity to the arrangement pattern of the first and second electrodes 140A, 140B. Therefore, when the first and second electrodes 140A, 140B are arranged as in FIG. 9A, the first and second outer electrodes have conventionally been arranged similarly thereto. In this case, two electrodes are arranged in a row in the Y direction, so that the gap between the first and second outer electrodes becomes narrower. This worsens the workability at the time of mounting the substrate as mentioned above.

In this embodiment, by contrast, the first and second connection areas 151A, 151B are formed while being arranged as shown in FIG. 9, thus yielding the capacitor with a favorable workability while lowering the ESL.

In order for the capacitor device to increase its capacitance, the first and second electrodes have generally been arranged in a row in the X direction on the front face of a substrate extending in one direction. As mentioned above, conventional arrangement patterns of the electrodes on the rear face side have usually been such that the first and second outer electrodes are arranged in a row in the X direction so as to correspond to the arrangement pattern on the front face side, whereby techniques for connecting with the outside have conformed to such an arrangement pattern.

Therefore, arranging the first and second connection areas 151A, 151B as shown in FIG. 9B while the first and second electrodes 140A, 140B have the arrangement pattern shown in FIG. 9A expands the versatility in connections of the capacitor 101 with the outside.

Since the first connection area 151A is formed on the end part 134 side while the second connection area 151B is formed on the end part 135 side, the number of through holes 133A, 133B can further be increased. Therefore, the ESL further decreases as mentioned above.

Since the first conduction area 152A and second conduction area 152B are formed as mentioned above, respective currents flowing through the first conduction area 152A and second conduction area 152B are directed opposite from each other, whereby the ESL is likely to decrease.

Though the second embodiment of the present invention is explained in the foregoing, the present invention is not limited thereto. For example, though an aluminum support is used as the valve metal support, any support constituted by a metal acting like a valve such as tantalum, niobium, titanium, hafnium, zirconium, zinc, tungsten, bismuth, or antimony may be employed.

Though the through holes 133A, 133B are constituted by holes penetrating through the main part 130 from the front face 131 to the rear face 132 filled with a conductive material, a conductive layer made of a conductive material may be formed on only the inner wall face of the holes, for example.

It is not always necessary for the first outer electrode 150A and second outer electrode 150B to have a substantially L-like form. In the first outer electrode 150A, the first conduction area 152A may have such a length (width) in the Y direction as to cover a plurality of through holes 133A, while yielding a convex form extending from the first connection area 151A to the second connection area 151B. The same holds for the second outer electrode 150B. When the first conduction area 152A has such a width as to cover the through holes 133A while the second conduction area 152B has such a width as to cover the through holes 133B, it is not necessary for the insulating film 161 to cover the first and second outer electrodes 150A, 150B in order to form the first and second connection areas 151A, 151B.

Though explained as a substantially rectangular strip, the form of the substrate 120 is not restricted in particular. It will be sufficient if the substrate 120 has a device mounting region which is a region, extending in one direction, for mounting the capacitor device 110. When the substrate (i.e., substrate main part) does not have a substantially rectangular strip form, it will be sufficient if the first and second conduction paths are formed within the device mounting region in the substrate main part, and the first and second electrodes are disposed in this region.

The anode part 111 and cathode part 112 in the capacitor device 110 are not limited to modes shown in FIGS. 6 to 8. For example, a lead or the like may be drawn out of the cathode part 112 having a substantially rectangular strip form, and the cathode part 112 and the lead may be employed as one cathode part. The same holds for the anode part 111.

Though an electrolytic capacitor is preferred, the capacitor 1 is not limited to the electrolytic capacitor in particular, but may be any capacitor as long as it is used while being mounted to a device mounting region extending in one direction.

As explained in the foregoing, one aspect of the capacitor in accordance with the present invention can achieve a large capacitance with a low ESL.

Another aspect of the capacitor in accordance with the present invention ameliorates the workability at the time of mounting it to a substrate.

What is claimed is:

1. A capacitor comprising:
   a capacitor device including an anode part and a cathode part; and
   a substrate including a device mounting region for mounting the capacitor device, the device mounting region extending in one direction and having a short dimension and a long dimension that is greater than the short dimension, the long dimension extending in a longitudinal direction;
   wherein the substrate includes:
   a main part formed with first and second conduction paths penetrating therethrough from a front face to a rear face;
   first and second electrodes disposed in the device mounting region on the front face, the first and second electrodes being connected to the anode and cathode parts, respectively; and
   first and second outer electrodes disposed on the rear face, the first and second outer electrodes being electrically connected to the first and second electrodes by way of the first and second conduction paths, respectively;
   wherein
   the first and second electrodes are arranged in a row in the longitudinal direction of the device mounting region;
   the first and second outer electrodes include first and second connection areas for connecting with external wiring; and the first and second connection areas extend in the longitudinal direction of the device mounting region, and are arranged in a row in a direction intersecting the longitudinal direction.

2. A capacitor according to claim 1, wherein the area of the first outer electrode excluding the first connection area and the area of the second outer electrode excluding the second connection area are covered with an insulating material.

3. A capacitor according to claim 1, wherein a plurality of first conduction paths align along a fringe of the first electrode on the second electrode side; and wherein a plurality of second conduction paths align along a fringe of the second electrode on the first electrode side.

4. A capacitor according to claim 1, wherein the first and second conduction paths are formed between the first and second connection areas;
the first outer electrode includes a first conduction area extending from the first connection area to the second connection area so as to cover the area of the rear face formed with the first conduction path;
the second outer electrode includes a second conduction area extending from the second connection area to the first connection area so as to cover the area of the rear face formed with the second conduction path; and
the first and second conduction areas are arranged in a row in the longitudinal direction of the device mounting region.

5. A capacitor according to claim 1, wherein the second electrode has an area greater than that of the first electrode.

6. A capacitor comprising:
a capacitor device including an anode part and a cathode part; and
a substrate including a device mounting region for mounting the capacitor device, the device mounting region extending in one direction and having a short dimension and a long dimension that is greater than the short dimension, the long dimension extending in a longitudinal direction;
wherein the substrate includes:
a main part formed with first and second conduction paths penetrating therethrough from a front face to a rear face;
first and second electrodes disposed in the device mounting region on the front face, the first and second electrodes being connected to the anode and cathode parts, respectively; and
first and second outer electrodes disposed on the rear face, the first and second outer electrodes being electrically connected to the first and second electrodes by way of the first and second conduction paths, respectively; wherein
the first and second electrodes extend in the longitudinal direction of the device mounting region and are arranged in a row in a direction intersecting the longitudinal direction;
the first and second outer electrodes include first and second connection areas for connecting with external wiring; and
the first and second connection areas are arranged in a row in the longitudinal direction.

7. A capacitor according to claim 6, wherein the first connection area is formed on one end side of both longitudinal end parts of the device mounting region in a region of the rear face corresponding to the device mounting region, whereas the second connection area is formed on the other end side of both end parts.

8. A capacitor according to claim 6, wherein the area of the first outer electrode excluding the first connection area and the area of the second outer electrode excluding the second connection area are covered with an insulating material.

9. A capacitor according to claim 6, wherein a plurality of first conduction paths align along a fringe of the first electrode on the second electrode side, whereas a plurality of second conduction paths align along a fringe of the second electrode on the first electrode side.

10. A capacitor according to claim 9, wherein the first and second conduction paths are arranged in a row in a direction substantially orthogonal to the longitudinal direction of the device mounting region.

11. A capacitor according to claim 6, wherein the first and second conduction paths are formed between the first and second connection areas; wherein
the first outer electrode includes a first conduction area extending from the first connection area to the second connection area so as to cover the area of the rear face formed with the first conduction path;
the second outer electrode includes a second conduction area extending from the second connection area to the first connection area so as to cover the area of the rear face formed with the second conduction path; and
the first and second conduction areas are arranged in a row in a direction intersecting the longitudinal direction of the device mounting region.

* * * * *